T. PIMER.
Improvement in Rope-Clamps.

No. 129,860.  Patented July 23, 1872.

Witnesses:
W. Bradford

Inventor:
Thos. Pimer
D. P. Holloway & Co.
Attys

UNITED STATES PATENT OFFICE.

THOMAS PIMER, OF NEW LONDON, CONNECTICUT.

IMPROVEMENT IN ROPE-CLAMPS.

Specification forming part of Letters Patent No. 129,860, dated July 23, 1872.

Specification describing a certain Improvement in Couplings for Ropes and Cables, invented by THOMAS PIMER, residing at New London, in the county of New London and State of Connecticut.

The nature of my invention consists in providing a tubular coupling, composed of two or more sections hinged together, and closed to clamp a rope or cable by means of a movable collar in the shape of a nut or other device adapted to the purpose, the interior surfaces of the sections or jaws being constructed with spurs to enter the rope or cable as the jaws are closed upon it, or with rings, or otherwise-shaped projections to compress the rope or cable so that it cannot be withdrawn.

Figure 1:
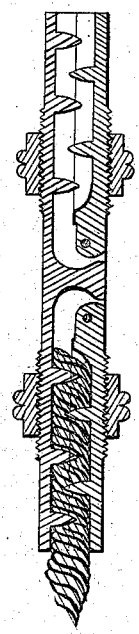
Figure 2:
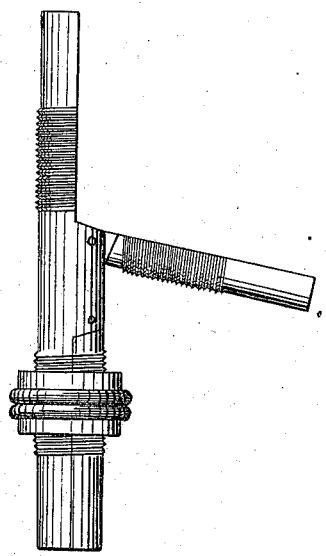
Figure 3:
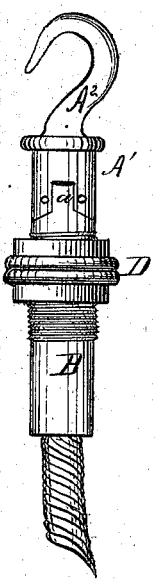
Figure 4:
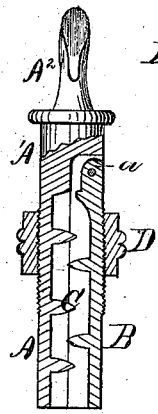

Figure 1 represents an axial section of a coupling adapted to splice the ends of a rope or ropes together. Fig. 2 is an elevation thereof, the hinged jaw at one end being opened. Fig. 3 illustrates a clamp terminating at one end in a hook for attachment to a block or other device. Fig. 4 is a section thereof.

The same letters of reference are employed in all the figures in the designation of identical parts.

Where this device is simply to constitute a termination of a rope or cable to adapt it for ready attachment to, and disconnection from, a block or hook, it is composed of two sections, A and B, hinged together at $a$, the section or jaw A being constructed with a shank, $A^1$, of suitable length, terminating in a hook or eye, $A^2$. Each jaw is a half hollow cylinder, so that when they are closed together a cylindrical tube is formed for the reception and retention of the end of a rope or cable. The interior surfaces of the jaws are provided with spurs C, which are best adapted for wire-cables or otherwise formed projections, which shall either enter the material of the rope or cable or simply compress it sufficiently to prevent its withdrawal. The means shown for closing the jaws around the rope consist of a nut, D, fitted on screw-threads chased upon the outer surfaces of the jaws. In Figs. 1 and 2 a coupling or splice is shown composed of three sections and two nuts, so that the ends of ropes may be clamped in opposite ends of the coupling.

The clamp and coupling above described are adapted for all kinds of rigging, tackle, bell-ropes, cables, &c.

What I claim as my invention, and desire to secure by Letters Patent, is—

A tubular clamp or coupling for ropes and cables, composed of two or more hinged sections, provided with projections upon their interior surfaces and a nut or equivalent device for closing the sections, substantially as specified.

In testimony whereof I have signed my name to this specification in the presence of two subscribing witnesses.

THOMAS PIMER.

WILLIAM BELCHER,
ANNE BELCHER.